UNITED STATES PATENT OFFICE.

CLAUS A. SPRECKELS AND CHARLES A. KERN, OF NEW YORK, N. Y., ASSIGNORS, BY MESNE ASSIGNMENTS, TO FEDERAL SUGAR REFINING COMPANY, OF JERSEY CITY, NEW JERSEY, A CORPORATION OF NEW JERSEY.

PROCESS OF PURIFYING SUGAR AND SOLUTIONS THEREOF.

SPECIFICATION forming part of Letters Patent No. 722,157, dated March 3, 1903.

Application filed July 2, 1902. Serial No. 114,032. (No specimens.)

*To all whom it may concern:*

Be it known that we, CLAUS A. SPRECKELS and CHARLES A. KERN, citizens of the United States, and residents of the borough of Manhattan, city and State of New York, have invented certain new and useful Improvements in Processes of Purifying Sugar and Solutions Thereof, of which the following is a full and true description.

The object of this invention is to economically and quickly remove impurities from sugar or sugar solutions.

The present invention is a specific form of the process described and claimed in our Letters Patent of the United States, No. 698,150, dated April 22, 1902, for processes of purifying sugar and solutions thereof. That patent covers, broadly, the employment of a sulfonated fluid defecating or cleansing agent for the treatment of impure sugar.

We have ascertained that there are certain advantages, hereinafter recited, resulting from the employment of an essential-oil sulfonated or sulfoöleaginous defecating or cleansing agent—viz., one consisting of or containing a cleanser produced by the action of sulfuric acid or a mixture of acids containing sulfuric acid upon essential oils in such proportions that there are no injurious effects upon the sugar from the sulfuric acid, and sulfonated bodies are produced which have greater absorbent properties for the earthy or metallic salts and for the invert sugar ordinarily found associated with sugar or sugar-bearing bodies and the caramel produced in the process of manufacture than the adherent properties of such impurities to the sugar itself, and subsequently separating the sugar from the defecating or cleansing composition containing the absorbed impurities.

We believe we are the first to discover the use of essential oil sulfonated or sulfoöleaginous bodies or material containing the same for the purpose of cleansing or purifying sugar.

In our said patent we have substantially stated as an example of the way in which our cleansing material may be prepared for use the following: Mix sulfuric acid, preferably of 1.835 specific gravity, (66° Baumé,) or a mixture of sulfuric acid with other acids in the proportion of, say, twenty parts, by weight, of acid or acid mixture with one hundred parts, by weight, of one or more essential oils. The sulfuric acid is added to the body or bodies gradually, so as to maintain a low temperature, the work being preferably carried out in a cooled receptacle, and the mixture is allowed to stand for a few hours. The excess of acid is removed or neutralized, either by the addition of alkali or by the addition of water or gravital separation. The proportion and strength of acid above suggested may be used in sulfonating each and every one of the substances or mixtures hereinafter mentioned. The cleansing or defecating body produced is of course in all cases fluid. The proportion and strength of acid may of course be varied in well-known ways, and other well-known acids may be mixed with the sulfuric acid without departure from our invention, it being borne in mind that the result is that the body when acted upon by the sulfuric acid and in the condition in which it is to be used will not contain sulfuric acid in any amount injurious to the sugar and will have an absorbent property for the impurities greater than the adherent properties of such impurities for the sugar itself.

As recommended in our Patent No. 698,150, we may in preparing an essential-oil sulfonated or sulfoöleaginous body proceed as follows: Take four parts, by weight, of an essential oil (commercial oil of turpentine being an example) and add while stirring the oil one part, by weight, of sulfuric acid (preferably 66° Baumé) or mixture of acids containing sulfuric acid, preferably mixing the acid with the oil gradually or at all events under such conditions that a low temperature will be maintained. After the incorporation of the acid allow the mixture to stand for a few hours and then preferably remove or neutralize the excess of acid in the mixture. For this purpose we may neutralize the mixture by the addition of an alkali or mixture of alkalies, preferably carbonate of soda, caustic soda, carbonate of potash, caustic potash, or combinations thereof. When not neutralizing by the use of alkali, we proceed as follows: Add water about equal to the amount of oil in the original mixture and mix thoroughly. On standing the mixture separates into two layers, the upper fluid layer being the material in course of treatment and the lower consisting of water containing the surplus acid and other useless products, and we leave the mixture standing for several hours in a vessel properly arranged and then draw off the water containing superfluous acid, &c. To the mixture obtained by the addition of alkali, as above described, or by the addition of water, as above described, add a solution of common salt and water to free the mixture from any remaining acid or water or excess of alkali when used. After each addition of salt and water we allow the mixture to settle and draw off the saline solution. When the mixture is practically free from water, or from excess of alkali, when used, we may, as described in an application, Serial No. 82,825, filed by us on November 19, 1901, mix the essential-oil sulfonated or sulfoöleaginous body with or dissolve it in kerosene-oil or other hydrocarbon oil or a mixture containing hydrocarbon oil.

An essential-oil sulfonated or sulfoöleaginous body dissolved in or mixed with a hydrocarbon oil or hydrocarbon-oil mixture has distinct beneficial characteristics and properties for the purpose of defecating or cleansing sugar, and we believe it to be a composition new in the arts.

When employing alkali to neutralize the acid, we have obtained good results by employing one part of caustic soda to each fifteen parts of the modified mixture. We have obtained good results by adding about fifty per cent. of kerosene-oil; but we do not state this as a fixed percentage, since it may be materially varied.

The use of an alkali, above described, for the purpose of neutralizing free sulfuric acid may result, as is well understood, in the production of sulfonic-acid salts or closely-allied salts in the defecating or cleansing liquid; but such salts so made are included by us under the general designation of bodies included under our invention.

Our invention, generically stated, also includes defecating or cleansing liquids containing sulfonated or sulfoöleaginous bodies in connection with other bodies capable of being sulfonated made by utilizing mixtures containing one or more essential-oil bodies. We have attained good results from a number of such mixtures, of which the following may be cited as examples: first, rosin oil, oleic acid, and oil of turpentine; second, tallow and oil of turpentine.

The amount of the composition used may be varied to suit the different qualities of the material being treated; but the mass of sugar-bearing material and cleanser should be semifluid at least, if not already so. In all cases there should of course be enough to absorb out the impurities. For example, we have obtained excellent results when treating raw sugar by employing eight pounds of sulfonated cleanser to each ten pounds of raw sugar. As the essential-oil sulfonated cleanser has no injurious effect upon the sugar-crystals or sugar liquor, the quantity of composition may be increased as desired.

We have found that the employment of a sulfonated or sulfoöleaginous essential-oil defecating or cleansing agent for the treatment of sugar or sugar solutions is advantageous.

When the operator employs a mixture of acids containing sulfuric acid, this mixture is to be treated for the purposes of our invention as the equivalent of sulfuric acid alone, since the latter body is the essential agent in the production of a sulfonated essential oil.

As stated in our said Patent No. 698,150, our preferred method of separating a sulfonated or sulfoöleaginous body and impurities from sugar-crystals is as follows: After the intimate mixture of the cleansing material in liquid form and the sugar under treatment we preferably employ a centrifugal machine driven at a high rate of speed for the purpose of separation. The mixture of the composition and the material being treated is put into the centrifugal machine and the composition and the absorbed impurities are expelled from the mass. This expelled mixture may subsequently be treated for the recovery therefrom of the cleanser. The mechanical impurities, if any—such as stocks, stones, straws, &c.—still left with the sugar after separating out the composition and the impurities it has absorbed may be removed in any well-known manner, as by dissolving the mass of sugar-crystals in water and by the filtration hereinafter described. In order to remove any slight traces of our cleansing body or composition from a mass of sugar-crystals, we may subject the mass to a further treatment, such as dissolving the same, adding fullers' earth or a substitute therefor, and then filtering out the same and crystallizing the sugar. If the material to be treated is in the form of sugar-juice, sugar liquor, or molasses, we may mix the same with an amount of essential-oil sulfonated or sulfoöleaginous body approximately equal in amount to the weight of the impurities as ascertained by chemical analysis of a portion of the liquor in order to absorb out the impurities other than the solid impurities, and we then subject the mixture to any desired subsequent processes for filtering out the purified sugar liquor, as by the use of fullers' earth, above described by us, and subsequent crystallization of the sugar. If the solution is at all acid, it may be neutralized by the addition of a little slaked lime.

If any of the essential-oil sulfonated or sulfoöleaginous bodies utilized are in the form used at all soluble in water, they may nevertheless be readily availed of in connection with concentrated sugar solutions, as they are practically insoluble in such sugar solutions. The above or any particular process for separating the essential-oil sulfonated or sulfoöleaginous cleanser from the sugar is, however, not an essential part of our present invention; but forms of process for removing the cleansing body are more fully described in our Patents Nos. 699,933 and 700,099, dated May 13, 1902.

We claim—

1. In the method of cleansing sugar from its impurities, the step which consists in mixing with the impure sugar a cleansing agent containing a sulfonated essential oil, substantially as described.

2. In the method of cleansing sugar from its impurities, the step which consists in mixing with the impure sugar a cleansing agent containing a sulfonated compound which includes sulfonated essential oil, substantially as described.

3. The method of cleansing sugar from its impurities, consisting in mixing with the impure sugar a cleansing agent containing a sulfonated essential oil, and then separating the cleansing agent and the impurities carried by it, from the sugar, substantially as described.

4. In the method of cleansing sugar from its impurities, the step which consists in mixing with the impure sugar a cleansing agent containing a sulfonated essential oil and mixed with hydrocarbon oil, substantially as described.

CLAUS A. SPRECKELS.
CHARLES A. KERN.

Witnesses:
TEILE H. MÜLLER,
STEPHEN EIGEN.